Figure 1:
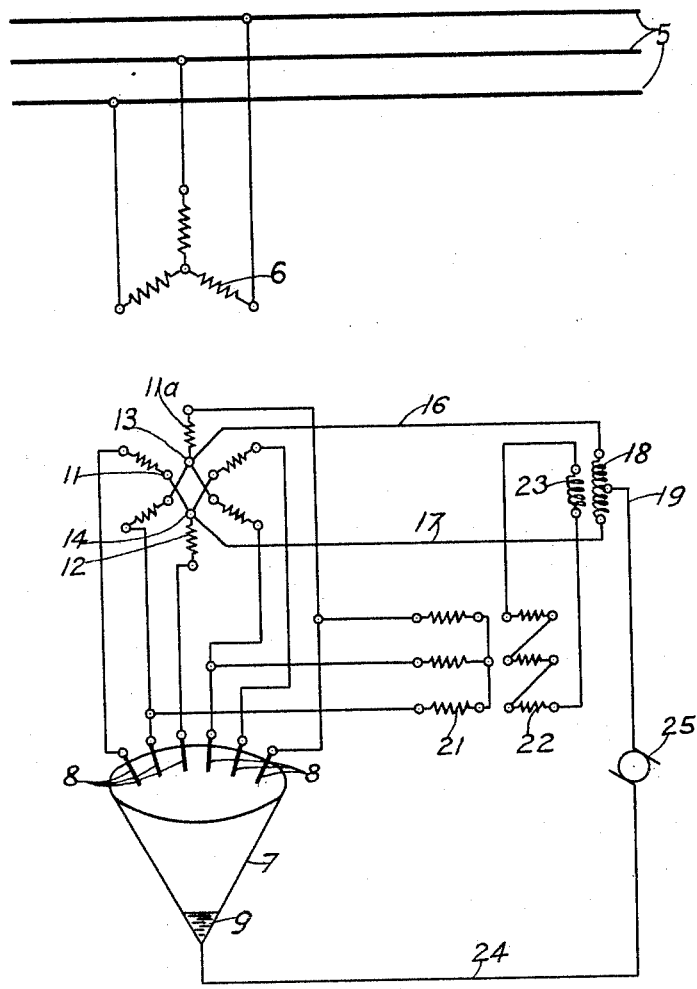

April 14, 1931. J. KUBLER 1,800,838
ARRANGEMENT FOR DIRECT CURRENT RECTIFIER SUPPLYING
FROM TRANSFORMERS WITH ABSORPTION REACTANCES
Filed Oct. 24, 1928

Inventor
Johannes Kubler
By Alfred H Dyson
Attorney.

Patented Apr. 14, 1931

1,800,838

UNITED STATES PATENT OFFICE

JOHANNES KUBLER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ARRANGEMENT FOR DIRECT-CURRENT RECTIFIER SUPPLYING FROM TRANSFORMERS WITH ABSORPTION REACTANCES

Application filed October 24, 1928, Serial No. 314,716, and in Germany October 24, 1927.

This invention relates to means for improving the operation of mercury vapor electric current rectifier systems and, particularly, to such rectifier systems provided with auto-transformers or as sometimes referred to as absorption reactance coils.

Electric current rectifying systems are provided with auto-transformers or so-called absorption reactance coils for the purpose of providing more efficient utilization of the supply transformer of the system, for permitting the use of a smaller transformer or to secure better voltage regulation in rectifier operation.

When auto-transformers are employed in rectifying systems the voltage thereof is a function of the load on the rectifier for light loads thereof and, for large loads on the rectifier, the voltage approaches a constant. The reason for this action is that the fixed voltage drop through the auto-transformers is approximately proportional to the current at light loads but changes only slightly at heavy loads, due to saturation of the coils.

The voltage of the auto-transformers is principally that of the third harmonic and the magnetization current thereof is that of the overwave of the rectifier current. However, during periods of increase of the rectifier current, the current of the overwave is insufficient to magnetize the said transformers, with resulting decreased voltage drop therethrough, and consequent increase of the rectifier current. Such operation results in disadvantageous operation of apparatus supplied by the rectifier system because of the voltage increase at the heavier loads thereof.

It is therefore among the objects of the invention to prevent increase in the output voltage of a rectifier upon increase of the load thereon.

A further object of the invention is to provide auto-transformers, when employed in rectifying systems, with magnetizing current of such character or order as to vary substantially in accordance with the output load of the rectifier during periods of increasing loads thereof.

A further object of the invention is to supply auto-transformers, when employed in rectifying systems, with magnetizing current such as to create flux in opposition to the flux created therein by virtue of the flow therethrough of the output current of the rectifier and thereby prevent decreased voltage drop through the transformer with resultant prevention of increase of the output voltage of the rectifier during periods of increasing load.

A further object of the invention is to supply rectifier systems with absorption reactance coils which are excited from a current source in opposition to the usual sources for supplying the rectifier.

Further objects and advantages will be apparent to those skilled in the art, from the following description and the drawing accompanying and forming a part of this specification.

The drawing shows a schematic diagram of an electric current rectifying system embodying the principle of the invention.

Referring to the drawing by characters of reference, 5 indicates a three phase alternating current supply system to which the primary winding 6 of a transformer is connected. A mercury vapor electric arc rectifier of any known construction, having anodes 8 and a cathode 9 is shown at 7. The anodes 8 are connected to separate secondary windings 11 and 12, forming a portion of the transformer with the primary winding 6 which supplies current to the rectifier 7. Each of the separate secondary windings 11 and 12 is composed of three portions $11_a$, $11_b$, $11_c$, and $12_a$, $12_b$, $12_c$ respectively. The several portions of each of the secondary windings are connected at the star points 13 and 14 respectively.

As is usual in rectifier systems, the direct current work circuit includes a lead connected to the neutral point of the transformer secondary windings and a lead connected to the cathode of the rectifier. In the present invention, because the rectifier supply transformer secondary is formed in two parts 11 and 12, two leads 16 and 17 are connected, respectively, to the transformer neutral or star points 13 and 14. The leads 16 and 17 lead to and are connected at their opposite ends to an auto-transformer 18. A lead 19 is connected to the mid-point 18 to form the transformer side of the direct current work circuit.

To prevent increase in the work circuit voltage during periods of increasing load on the rectifier, the auto-transformer 18 is contra-excited so that the voltage drop therethrough is no longer a pure function of the work circuit current but varies in accordance with the magnitude of the contra-excitation current. The circuit for the contra-excitation current includes a transformer primary winding 21 connected to alternate anode leads and a secondary winding 22 serially connected to an exciter winding 23 of the auto-transformer 18. The transformer for the exciter winding 23 has the primary winding 21 thereof connected in star and the secondary winding 22 comprising three sections serially connected to each other and in series with the exciter winding 23. It will be understood that other elements, their arrangements and connections may be employed to create a third harmonic in the transformer 18, and the embodiment herein shown is believed to be preferable.

The transformer comprising the primary winding 21 and the secondary 22 is highly saturated so that the magnetization current for the auto-transformer 18 is supplied with an impressed voltage of frequency corresponding to the third harmonic of the rectifier current, and produces in the transformer 18 an excitation current at the terminal of the direct current line 19 corresponding to the third harmonic of the rectifier supply source. Since the voltage in the winding 11 is pre-determined and constant, the voltage of the third harmonic in the transformer 18 is also constant and independent of the load current of the rectifier.

The direct current side of the system is completed by a line 24 from the cathode 9 and a motor 25, representing the apparatus to be supplied with the direct current from the rectifier.

With this arrangement a voltage is induced in the auto-transformer which, according to its size, determines the phase and frequency of the voltage produced in the rectifier work circuit. This voltage is independent of the load upon the rectifier and exists during periods of light or no loads on rectifier. It will be apparent to those skilled in the art that the undesired voltage increase in the direct current work circuit of the system is therefore substantially decreased.

Although I have illustrated only one embodiment of my invention, it will be apparent to those skilled in the art that various changes may be made therein without departing from the spirit thereof or the scope of the appended claims.

What I claim is:—

1. In an electric current rectifying system including a rectifier, an alternating current supply system, a supply transformer primary winding connected to said supply system, secondary windings for said transformer connected with said rectifier, direct current lines connected with said secondary windings, an auto-transformer connected with said direct current lines, an exciting coil for said auto-transformer supplied from one of said secondary windings, means for supplying exciting current to said exciting coil, and direct current lines from said auto-transformer and from said rectifier.

2. In an electric current rectifying system including a rectifier, an alternating current supply system, a supply transformer primary winding connected to said supply system, secondary winding groups for said transformer, said winding groups being connected with said rectifier anodes, direct current lines connected with said secondary windings, an absorption reactance coil connected between said direct current lines, an exciting coil for said absorption reactance coil, means for supplying said exciting coil from one of said secondary winding groups, and direct current lines from said reactance coil and from said rectifier.

3. In an electric current rectifying system including a metal vapor electric current rectifier, an alternating current supply system, a rectifier supply transformer primary winding connected to said supply system, secondary winding groups for said transformer connected with said rectifier, direct current lines connected between said secondary winding groups, an absorption reactance coil connected between said direct current lines, an exciting coil for said reactance coil, a transformer for supplying said exciting current including a primary winding connected with one of said secondary winding groups of said rectifier supplying transformer, and a secondary winding connected with said exciting coil, and direct current lines from said reactance coil and from said rectifier.

4. In an electric current rectifying system including a metal vapor electric current rectifier, an alternating current supply system, a rectifier supply transformer primary winding connected to said supply system, secondary winding groups for said transformer connected with said rectifier, direct current lines connected with said secondary winding groups, an auto-transformer connected between said direct current lines, an exciting coil for said auto-transformer, and a transformer for supplying said exciting coil including a primary winding connected with one of said secondary winding groups of said rectifier supplying transformer, said second-named primary winding being connected in star, said transformer for supplying said exciting coil further comprising a secondary winding connected with said exciting coil, said secondary winding comprising a plurality of sections connected in series, and direct current lines from said auto-transformer and from said rectifier.

In testimony whereof I have hereunto subscribed my name this 28th day of September, A. D. 1928.

JOHANNES KUBLER.